UNITED STATES PATENT OFFICE.

WILLIAM A. FAIRBURN, OF SHORT HILLS, NEW JERSEY, AND FREDERICK V. D. CRUSER, OF OSWEGO, NEW YORK, ASSIGNORS TO THE DIAMOND MATCH COMPANY, OF CHICAGO, ILLINOIS, A CORPORATION OF ILLINOIS.

MATCH COMPOSITION AND PROCESS OF PRODUCING THE SAME.

1,290,146.     Specification of Letters Patent.     Patented Jan. 7, 1919.

No Drawing.     Application filed September 28, 1915. Serial No. 53,013.

*To all whom it may concern:*

Be it known that we, WILLIAM A. FAIRBURN, a resident of Short Hills, in the county of Essex and State of New Jersey, and FREDERICK V. D. CRUSER, a resident of the city and county of Oswego and State of New York, both citizens of the United States, have invented certain new and useful Improvements in Match Compositions and Processes of Producing the Same, of which the following is a specification.

This invention relates to a composition for use more especially in the production of the "safety" bulb of "double dipped" matches. It also relates to a process of producing the composition.

The primary object of our invention is to provide a match composition in which potassium chlorate and barium chromate are economically formed and incorporated with the combustible, flaming and binding ingredients of the composition. Potassium chlorate is the material needed in the composition for supplying oxygen while the chromate has the beneficial effect of reducing the hygroscopic property of the binder.

In carrying out our invention in the preferred way, we mix with an aqueous paste of combustible, flaming and binding materials (such, for example, as sulfur, glue and resin) with or without the addition of inert substances (such as glass, whiting and silex) barium chlorate, barium hydroxid and potassium dichromate in the proportion of their molecular weights, adding a slight excess of barium hydroxid. These compounds being in solution, they react to produce barium chromate and potassium chlorate and water which become intimately commingled with the other ingredients of the composition; that is to say, the barium chlorate and potassium dichromate react to produce potassium chlorate and barium dichromate, which latter in turn reacts with barium hydroxid to form barium chromate.

The following ingredients, in the proportions, by weight, specified have given good results, viz:—barium chlorate 26 parts; potassium dichromate 24 parts; barium hydroxid 27 parts; glue 12 parts; resin 4 parts; sulfur 2 parts; fillers 14 parts, and water 70 parts.

The preparation just described yields a composition indicated as follows:

Barium chromate, approximately 41 parts
Potassium chlorate, approximately 20 "
Glue _____ 12 "
Resin _____ 4 "
Sulfur _____ 2 "
Fillers _____ 14 "
Water _____ 85 "

It is not essential in our invention that all the potassium chlorate should be formed by the reaction as a certain amount may be added directly to the composition and only a portion formed by the foregoing explained reaction and the proportions may be varied at will, but in respect of the barium chlorate, barium hydroxid and potassium dichromate, it is important that they shall be used in the proportion of their molecular weights in order to secure the efficient reaction above specified.

Also in practising the invention, we find that it is advisable first to dissolve the barium chlorate in water, then to add the barium hydroxid and finally the potassium dichromate. In this way as the chromic acid is formed, by the reaction of the potassium dichromate on the barium chlorate, the chromic acid is neutralized instantly by the barium hydroxid which is in excess. This prevents the formation of chlorin which might have a detrimental effect upon the composition.

It has heretofore been proposed in the manufacture of so-called headless matches to impregnate the end of the match stick with barium chlorate and then to apply externally of the impregnated end of the splint a thin coating of an igniting composition containing potassium dichromate and potassium chlorate; or to mix the compounds, (without dissolving them) in the form of a paste and dip the end of the splint into the mass, but in each course of procedure the chemical reactions and characteristic properties of our invention were admittedly absent.

We claim—

1. A non-acid match composition composed of barium chromate, potassium chlorate, combustible and flaming materials, and a binder, the barium chromate being present in amount much greater than the amount of potassium chlorate.

2. A non-acid match composition composed of barium chromate, potassium chlorate, sulfur, inert matter, and a binder, the barium chromate being present to the extent of about double the amount of the potassium chlorate.

3. A process of making a match composition which consists in mixing in the proportion of their molecular weights barium chlorate, an alkali and potassium dichromate in solution, with combustible and flaming material and a binder.

4. A process of making a match composition which consists in mixing in the proportion of their molecular weights barium chlorate, barium hydroxid and potassium dichromate, in solution, with combustible and flaming material and a binder.

5. A process of making a match composition which consists in mixing barium chlorate, barium hydroxid and potassium dichromate in the proportion of their molecular weights in an aqueous paste containing combustible and flaming material and a binder.

WILLIAM A. FAIRBURN.
FREDERICK V. D. CRUSER.